United States Patent
Nishida et al.

(10) Patent No.: US 8,653,792 B2
(45) Date of Patent: Feb. 18, 2014

(54) POWER STORAGE SYSTEM INCLUDING A PLURALITY OF BATTERY MODULES AND ON/OFF DEVICES OR VOLTAGE CONVERTERS

(75) Inventors: Takehiko Nishida, Nagasaki (JP); Tetsuro Shigemizu, Nagasaki (JP); Katsuo Hashizaki, Nagasaki (JP); Kazuyuki Adachi, Fukuoka (JP); Shinji Murakami, Fukuoka (JP); Yoshihiro Wada, Fukuoka (JP); Kouji Kurayama, Fukuoka (JP); Hirofumi Fujita, Fukuoka (JP)

(73) Assignees: Mitsubishi Heavy Industries, Ltd., Tokyo (JP); Kyushu Electric Power Co., Inc., Fukuoka-shi, Fukuoka (JP)

( * ) Notice: Subject to any disclaimer, the term of this patent is extended or adjusted under 35 U.S.C. 154(b) by 130 days.

(21) Appl. No.: 13/055,574

(22) PCT Filed: Oct. 30, 2008

(86) PCT No.: PCT/JP2008/069806
§ 371 (c)(1),
(2), (4) Date: Jan. 24, 2011

(87) PCT Pub. No.: WO2010/018644
PCT Pub. Date: Feb. 18, 2010

(65) Prior Publication Data
US 2011/0127964 A1 Jun. 2, 2011

(30) Foreign Application Priority Data

Aug. 13, 2008 (JP) ................................. 2008-208429

(51) Int. Cl.
*H01M 10/46* (2006.01)
(52) U.S. Cl.
USPC ...................................................... 320/116

(58) Field of Classification Search
USPC .......................... 320/107, 114, 116, 118, 119
See application file for complete search history.

(56) References Cited

U.S. PATENT DOCUMENTS 6,262,494 B1 7/2001 Tsukuni et al.
8,030,895 B2 * 10/2011 Xiao et al. .................... 320/119
(Continued)

FOREIGN PATENT DOCUMENTS

| CN | 101043143 A | 9/2007 |
| JP | 11-273747 A | 10/1999 |

(Continued)

OTHER PUBLICATIONS

International Search Report of PCT/JP2008/069806, mailing date Jan. 20, 2009.
Chinese Office Action dated Jan. 16, 2013, issued in corresponding Chinese Patent Application No. 200880130363.X, with English Translation (14 pages).

(Continued)

*Primary Examiner* — Edward Tso
(74) *Attorney, Agent, or Firm* — Westerman, Hattori, Daniels & Adrian, LLP (57) ABSTRACT

An object is to reliably conduct cell balancing operation while suppressing deterioration of batteries and maintaining operating efficiency. When the cell balance control by the cell balancing circuit 3 is started, the system control device 30 sets an on/off device corresponding to the arm where the cell balance control is conducted to the open state; and when the cell balance control is completed, and the difference between the terminal voltage of a battery pack of the arm where the cell balance control has been conducted and the terminal voltages of the battery packs of the other arms falls within a preset allowable range, sets the on/off device, which has been in the open state, to the closed state.

18 Claims, 8 Drawing Sheets

(56) References Cited

U.S. PATENT DOCUMENTS

| | | | |
|---|---|---|---|
| 8,294,421 B2 * | 10/2012 | Bucur et al. | 320/116 |
| 2004/0257042 A1 * | 12/2004 | Liu et al. | 320/130 |
| 2005/0121979 A1 | 6/2005 | Matsumoto et al. | |
| 2009/0179616 A1 * | 7/2009 | Ichikawa et al. | 320/134 |

FOREIGN PATENT DOCUMENTS

| | | |
|---|---|---|
| JP | 3229696 B2 | 11/2001 |
| JP | 2003-244854 A | 8/2003 |
| JP | 2003-289629 A | 10/2003 |
| JP | 2004-032871 A | 1/2004 |
| JP | 2004-236473 A | 8/2004 |
| JP | 2005-020866 A | 1/2005 |
| JP | 2005-176461 A | 6/2005 |
| JP | 2007-259612 A | 10/2007 |

OTHER PUBLICATIONS

Decision to Grant a Patent dated Dec. 27, 2012, issued in corresponding Korean Patent Application No. 10-2011-7000369 (2 pages).

Japanese Office Action dated Apr. 30, 2013, issued in corresponding Japanese Patent Application No. 2008-208429, with Partial English translation (6 pages).

Decision to Grant a Patent dated Jul. 30, 2013 for Chinese Application No. 200880130363.X. (2 Pages).

Decision to Dismiss the Amendment isssued in corresponding Japanese Patent Application No. 2008-208429 dated Nov. 19, 2013 w/partial translation.

Decision of Rejection issued in corresponding Japanese Patent Application No. 2008-208429 dated Nov. 19, 2013 w/partial translation.

* cited by examiner

POWER STORAGE SYSTEM INCLUDING A PLURALITY OF BATTERY MODULES AND ON/OFF DEVICES OR VOLTAGE CONVERTERS

TECHNICAL FIELD

The present invention relates to a power storage system configured by connecting, in parallel, battery modules that are provided with a battery pack in which a plurality of batteries are connected in series.

BACKGROUND ART

As a cell balancing method for secondary batteries in the related art, a variety of methods have been proposed and commercialized, such as those utilizing resistance bypass, transformers, flying capacitors, charging power supplies, and so forth. All of these methods equalize the charge states of each of cells in a battery pack in which a plurality of cells are connected in series.

Although the cell balancing methods are generally operated so as to equalize each cell voltage, during the equalization control, there is a possibility that a balance error may be caused due to a voltage drop caused by a charging and discharging current and an internal resistance. When charging or discharging is performed with high current, this error becomes significant, and therefore, it has been conventionally proposed to conduct equalization control when charging and discharging is stopped or when the charging and discharging current is low.
Patent Citation 1:
The Publication of Japanese Patent No. 3229696

DISCLOSURE OF INVENTION

With a battery pack configured by connecting, in parallel, a plurality of arms that are configured by connecting a plurality of cells in series, there is a problem in that, when equalization is required for one of the arms, if the equalization is to be conducted by stopping the operation of all arms, the operation of arms that are not required to be equalized is also forced to be stopped, thereby lowering the operating efficiency.

The present invention has been conceived to solve the problem described above, and an object thereof is to provide a power storage system that is capable of reliably conducting a cell balancing operation while suppressing deterioration of the batteries and reduction of the operating efficiency of the batteries.

The present invention provides a power storage system including a plurality of battery modules that are connected in parallel and that are connected to a power converter that controls charging and discharging; a plurality of on/off devices that are provided between each of the battery modules and the power converter; and a control unit that controls the on/off devices, each of the battery modules having a battery pack with a plurality of batteries connected in series, and a cell balancing circuit provided in correspondence to the battery pack, wherein the control unit sets the on/off device corresponding to the battery module where cell balance control is conducted to an open state when cell balance control by the cell balancing circuit is started, and sets the on/off device, which has been in the open state, to a closed state when the cell balance control is completed and a difference between a terminal voltage of the battery module where the cell balance control has been conducted and a terminal voltage of the other battery modules falls within a preset allowable range.

According to such a configuration, because the on/off device is disposed between each of the battery modules and the power converter, it is possible to disconnect only the battery module where the cell balance control is conducted from the power converter. Accordingly, charging and discharging of the other battery modules can be continuously conducted. Furthermore, when the battery module in a disconnected state is to be reconnected, since the voltage differences with respect to the other battery modules are taken into account, it is possible to solve the problem of a flow of overcurrent and so forth.

The above-mentioned power storage system may further include a resistive part that is connected in parallel with each of the on/off devices; and a second on/off device that is connected in series with the resistive part, wherein the control unit may set the second on/off device corresponding to the battery module where the cell balance control has been conducted to a closed state when the cell balance control of the battery module is completed; and may set the second on/off device to an open state and set the on/off device that is connected in parallel with the second on/off device to the closed state when the difference between the terminal voltage of the battery module where the cell balance control has been conducted and the terminal voltage of the other battery modules falls within a preset allowable range.

According to such a configuration, when the cell balance control is completed, because that battery module and the power converter are connected via the resistive part, it is possible to limit the amount of current flowing through the battery module. In addition, by providing the resistive part in this way, it is possible to connect the battery module where the cell balance control has been conducted to the power converter at an early point, and therefore, it is possible to improve the capacity of the power storage system.

The above-mentioned power storage system may further include a resistive part that is connected in parallel with each of the on/off devices; and a second on/off device that is connected in series with the resistive part, wherein the control unit may set the second on/off device and the on/off device corresponding to the battery module to the closed state for the battery module where the cell balance control is not conducted; may set the second on/off device and the on/off device corresponding to the battery module to the open state when the cell balance control of the battery module is to be conducted; may set the second on/off device corresponding to the battery module where the cell balance control has been conducted to the closed state when the cell balance control is completed; and may set the on/off device corresponding to the battery module where the cell balance control has been conducted to the closed state when the difference between the terminal voltage of the battery module where the cell balance control has been conducted and the terminal voltages of the other battery modules falls within a preset allowable range.

According to such a configuration, when the cell balance control is completed, because that battery module and the power converter are connected via the resistive part, it is possible to limit the amount of current flowing through the battery module. In addition, by providing the resistive part in this way, it is possible to connect the battery module where the cell balance control has been conducted to the power converter at an early point, and therefore, it is possible to improve the capacity of the power storage system.

The above-mentioned power storage system may further include a charge/discharge device that adjusts the voltage of each of the battery packs, wherein, when the cell balance control is completed, the control unit may operate the charge/discharge device in accordance with the difference between the terminal voltage of the battery module where the cell balance control has been conducted and the terminal voltages of the other battery modules.

According to such a configuration, when the cell balance control is completed, if the difference between the terminal voltage of the battery module where the cell balance control has been conducted and the terminal voltages of the other battery modules is large, it is possible to adjust the terminal voltage of the battery module by operating the charge/discharge device. Accordingly, it is possible to make the terminal voltage of the battery module where the cell balance control has been conducted close to the terminal voltages of the other battery modules at an early point. As a result, it is possible to reconnect the battery module that has been in a disconnected state at an early point.

In the above-mentioned power storage system, when the cell balance control by the cell balancing circuit is started, the control unit may set the on/off device corresponding to the battery module where the cell balance control is conducted to the open state only for a period of time during which each of the cell voltages of the battery pack that is subjected to the cell balance control is measured.

By doing so, because the battery module is disconnected from the power converter only for a short period of time during which the cell voltage is measured, it is possible to keep the variation of the voltage in the battery module during this period of time small. Accordingly, it is possible to reconnect this battery module in a rapid manner without considering the voltage differences with the other battery modules.

The above-mentioned power storage system may further include a voltage converter instead of the on/off device, wherein, when the cell balance control by the cell balancing circuit is started, the control unit may control the voltage converter so that the amount of current flowing through the battery module where the cell balance control is conducted is equal to or less than a rated value, and when the cell balance control is completed, may restore an operation of the voltage converter to a normal state.

According to such a configuration, because the voltage converter is provided instead of the on/off device, it is possible to control the amount of current flowing through each of the battery modules by controlling the operation of this voltage converter. Accordingly, it is possible to prevent an overcurrent from flowing through the battery module by operating the voltage converter when the cell balance control is conducted, so as to control the amount of current flowing through the battery module where the cell balance control is conducted, and in addition, by restoring the operation of the voltage converter to the normal state when the cell balance control is completed.

The above-mentioned phrase "so that the amount of current flowing through the battery module is equal to or less than a rated value" includes the case where the current is equal to zero. In other words, it also includes the case where the operation of the voltage converter is stopped.

In the above-mentioned power storage system, when a required amount of power depending on a state of a load cannot be supplied by the power supply from the other battery modules alone during the cell balance control, the control unit may stop the cell balance control and restore the operation of the voltage converter corresponding to the battery module where the cell balance control is conducted to the normal state.

According to such a configuration, when a required amount of power cannot be supplied by the other battery modules alone during the cell balance control, since the cell balance control is stopped and the battery module where the cell balance control has been conducted is restored to the normal operational state, it is possible to operate the power storage system while maintaining the performance thereof, even when the cell balance control is being conducted.

In the above-mentioned power storage system, when the cell balance control by the cell balancing circuit is started, the control unit may control the voltage converter only for a period of time during which each of cell voltages in the battery pack that is subjected to the cell balance control is measured, so that the amount of current flowing through the battery module where the cell balance control is conducted is equal to or less than the rated value, and after the measurement of the cell voltage, may restore the operation of the voltage converter to the normal state.

By doing so, because the charging and discharging current of the battery module is controlled only for a short period of time during which the cell voltage is measured, it is possible to improve the operating efficiency of the battery module. The above-mentioned phrase "controlling the current flowing through the battery module" includes the case where the current is equal to zero. In other words, it also includes the case where the operation of the voltage converter is stopped.

The above-mentioned power storage system may further include one voltage converter which is connected to the power converter; and a fourth on/off device provided between each of the battery modules and the voltage converter; wherein the control unit may set the on/off device corresponding to the battery module where the cell balance control is to be conducted to the open state and set the fourth on/off device corresponding to the battery module to the closed state when the cell balance control by the cell balancing circuit is started; and may set the on/off device, which has been in the open state, to the closed state and set the fourth on/off device, which has been in the closed state, to the open state when the cell balance control is completed.

According to such a configuration, depending on the operating conditions of the voltage converter, it is always possible to keep the arm under the cell balance control in a state where it is connected with the power converter at all times, and therefore, it is possible to perform charging and discharging of the arm even if the cell balance control is being conducted. Accordingly, it is possible to improve the capacity of the power storage system.

In the above-mentioned power storage system, there may be a maximum number of battery modules capable of conducting the cell balance control simultaneously in the control unit, and the control unit may conduct the cell balance control within the range of the maximum number.

In the above-mentioned power storage system, the control unit may allow the cell balance control to be conducted with priority given to battery modules with larger cell voltage unevenness.

By doing so, it is possible to conduct the cell balance control efficiently, and to equalize the cell voltage unevenness between the battery modules.

In the above-mentioned power storage system, when a difference between a cell voltage difference of the battery module where the cell balance control is being conducted and a cell voltage difference of a battery module waiting for the cell balance control is equal to or less than a preset threshold, the control unit may perform switching of the battery modules where the cell balance control is to be conducted.

By doing so, it is possible to equalize the cell voltage unevenness between the battery modules. As a result, it is possible to prevent excessive unevenness among the cell voltages in the battery modules waiting for the cell balance control.

In the above-mentioned power storage system, a maximum number of battery modules capable of conducting the cell balance control simultaneously may be set to a number that can cope with an average load.

By doing so, it is possible to equalize the voltages across the cells in each of the battery modules while achieving the power storage system function.

In addition, it is possible to use a combination of the above-mentioned aspects within the permissible scope.

According to the present invention, an advantage is afforded in that the cell balancing operation can be surely conducted while suppressing deterioration of the batteries and maintaining the operating efficiency.

EXPLANATION OF REFERENCE 1-1, 1-2, . . . 1-$m$: arm
2: battery pack
3: cell balancing circuit
4: cell voltage sensor
5: battery pack voltage sensor
6: arm control device
7: charge/discharge device
10-1, 10-2, . . . 10-$m$: on/off device
12-1, 12-2, . . . 12-$m$: third on/off device
20, 20': power converter
30: system control device
40-1, 40-2, . . . 40-$m$: current control unit
41: resistance element
42: second on/off device
50, 50-1, 50-2, . . . 50-$m$: voltage converter

BEST MODE FOR CARRYING OUT THE INVENTION

Each of embodiments of a power storage system according to the present invention will be described below with reference to the drawings.

First Embodiment

Figure 1:
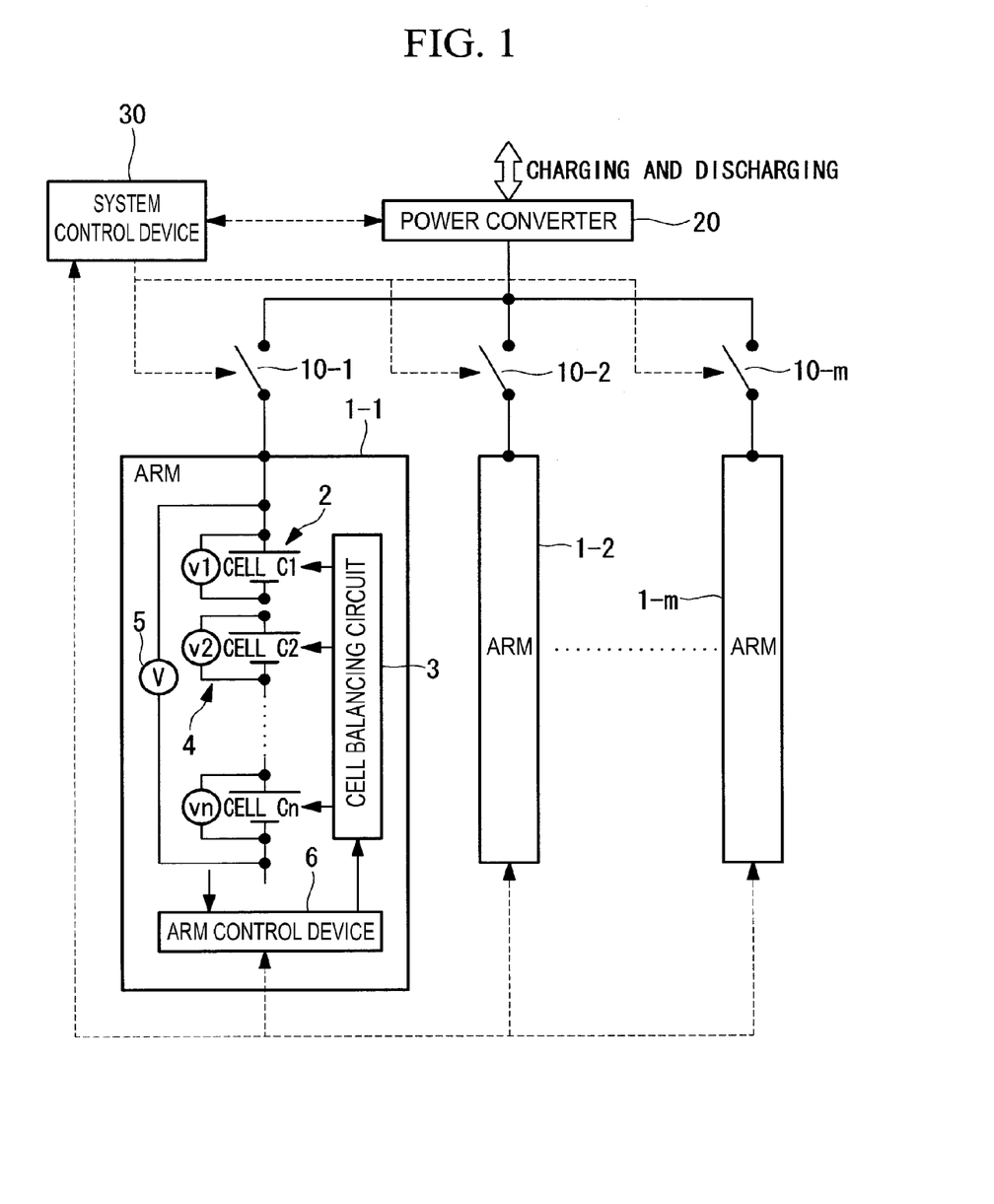
FIG. 1 is a diagram showing the schematic configuration of a power storage system according to a first embodiment of the present invention.

FIG. 1 is a block diagram showing the schematic configuration of a power storage system according to a first embodiment of the present invention. As shown in FIG. 1, the power storage system is provided with a plurality of arms (battery modules) 1-1, 1-2, . . . and 1-$m$ that are connected in parallel. Each of the arms 1-1, 1-2, . . . and 1-$m$ has the same configuration. The configuration will be explained by using the arm 1-1 as an example. The arm 1-1 is provided with a battery pack 2 in which a plurality of cells (batteries) C1, C2, . . . and Cn are connected in series; a cell balancing circuit 3; cell voltage sensors 4 that measure the voltages of the respective cells C1, C2, . . . and Cn; a battery pack voltage sensor 5 that measures the terminal voltage of the battery pack 2; and an arm control device 6 that controls the cell balancing circuit 3 and so forth.

The arms 1-1, 1-2, . . . and 1-$m$ are connected to a power converter 20 through respective on/off devices 10-1, 10-2, and 10-$m$. The power converter 20 is connected to, for example, a utility grid to which a load is connected, and the power converter 20 supplies power stored in the power storage system to the load and charges the power storage system by taking in power from the utility grid.

Each of the on/off devices 10-1, 10-2, and 10-$m$, and the power converter 20 are controlled by a system control device (control unit) 30. In addition, the system control device 30 and the arm control device 6 that is provided in each of the arms 1-1, 1-2, . . . and 1-$m$ are configured so as to be able to send and receive information. Thus, by sending and receiving information between each other, for example, the system control device 30 controls the open/closed state of the on/off devices 10-1, 10-2, . . . and 10-$m$ in synchronization with the operating timing of the cell balancing circuit 3. Furthermore, the arm control devices 6 in the respective arms 1-1, 1-2, . . . and 1-$m$ are configured so as to be able to send and receive information between each other. Accordingly, for example, it is possible to share the information of the terminal voltages of the battery packs 2, which are provided in the respective arms 1-1, 1-2, . . . and 1-$m$, between the arms.

During the operation of the power storage system, all of the on/off devices 10-1, 10-2, . . . and 10-$m$ are set to the closed state by the system control device 30, and each of the arms 1-1, 1-2, . . . and 1-$m$, and the power converter 20 are set to a connected state. During discharging, power stored in the battery pack 2 provided in each of the arms 1-1, 1-2, . . . and 1-$m$ is supplied to the load through the power converter 20, and during charging, power from the utility grid is supplied to each of the battery packs 2 through the power converter 20.

During such an operation, the cell voltage sensors 4 in the respective arms 1-1, 1-2, . . . and 1-$m$ detect, at predetermined time intervals, the cell voltages of the respective cells C1, C2, . . . and Cn that constitute the battery pack 2 and output this detection result to the arm control device 6. In addition, the terminal voltage of the battery pack 2 is detected by the battery pack voltage sensor 5, and the detection result is output to the arm control device 6.

The arm control device 6 calculates the voltage difference between each of the cells; if this voltage difference is outside a predetermined range of equalization that has been set in advance, it determines that the cell balance control (equalization of the cell voltages) is required and outputs a signal to that effect to the system control device 30.

In the following, a description is given assuming that the cell balance control is determined to be required in the arm 1-1.

The system control device 30, upon being notified that the cell balance control is required from the arm control device 6 of the arm 1-1, sets the on/off device 10-1 corresponding to the arm 1-1 to the open state and notifies the arm control device 6 in the arm 1-1 with a signal indicating that the on/off device 10-1 has been set to the open state. Upon receiving this notification, the arm control device 6 operates the cell balancing circuit 3. Accordingly, the cell balance control of the arm 1-1 is started, and the voltage differences between the cells C1, C2, . . . and Cn are slowly equalized. When the difference in the cell voltage falls within the range of equalization that is set in advance, the arm control device 6 stops the operation of the cell balancing circuit 3 and notifies the system control device 30 that the cell balance control has been completed.

Upon receiving the notification that the cell balance control has been completed, the system control device 30 periodically receives information regarding the terminal voltage of the battery pack 2 of each of the arms 1-1, 1-2, . . . and 1-$m$ from the arm control device 6 provided in each of the arms 1-1, 1-2, . . . and 1-$m$, and sets the on/off device 10-1 corresponding to the arm 1-1 to the closed state when the voltage difference between the terminal voltage of the battery pack 2 of the arm 1-1 and the terminal voltages of the battery packs 2 of the other arms 1-2 and 1-$m$ falls within the preset allowable range. Accordingly, the arm 1-1 is reconnected to the power converter 20 and is set to a state in which charging and discharging are enabled.

As described above, according to the power storage system of this embodiment, because the on/off devices 10-1, 10-2, . . . and 10-$m$ are disposed between each of the arms 1-1, 1-2, . . . and 1-$m$ and the power converter 20, it is possible to disconnect from the power converter 20 only the arm 1-1 where the cell balance control is conducted. Accordingly, charging and discharging of the other arms 1-2, . . . and 1-$m$ can be continuously conducted.

Furthermore, when the arm 1-1 in a disconnected state is to be reconnected, since the voltage differences with respect to the other arms 1-2, . . . and 1-$m$ are taken into account, it is possible to solve problems such as the flow of overcurrent and so forth, and to suppress deterioration of the battery pack 2 provided in the arm 1-1.

A known circuit can be employed as the above-mentioned cell balancing circuit 3. In addition, it is possible to suitably set/change the criterion in the arm control device 6 for determining whether the cell balance control is required. For example, it is possible to determine that the cell balance control is required when the difference between the maximum value and the minimum value of the cell voltage is equal to or more than a reference value set in advance.

Second Embodiment

Next, a power storage system according to a second embodiment of the present invention will be described.

In the above-described first embodiment, the on/off device corresponding to the arm where the cell balance control is being conducted is kept in the open state, thereby setting this arm and the power converter to the disconnected state until the cell balance control is completed. In this embodiment, the configuration of the power storage system is the same as in the above-mentioned first embodiment; however, the opening/closing timing of the on/off device by the system control device 30 is different.

In the following, the power storage system according to this embodiment will be described with reference to FIG. 1. In addition, also in this embodiment, a description is given assuming that the cell balance control is determined to be required in the arm 1-1.

In the power storage system according to this embodiment, upon receiving the notification from the arm control device 6 of the arm 1-1 that the cell balance control is to be conducted, the system control device 30 sets the on/off device 10-1 corresponding to the arm 1-1 to the open state and sends a notification that the on/off device 10-1 has been set to the open state to the arm control device 6 of the arm 1-1. Upon receiving the notification that the on/off device 10-1 has been set to the open state, the arm control device 6 executes each of the processes related to the cell balance control in a predetermined order.

First, in the cell balance control, the cell voltages are measured by the cell voltage sensors 4, and this measurement result is output to the arm control device 6. Upon obtaining the measurement result of the cell voltages, the arm control device 6 notifies the system control device 30 that the measurement of the cell voltages has been finished. Upon receiving this notification, the system control device 30 sets the on/off device 10-1, which has been in the open state, to the closed state.

In addition, upon obtaining the measurement result of each of the cell voltages from the cell voltage sensors 4, the arm control device 6 of the arm 1-1 calculates the period of time required for the cell balance control from the unevenness among these cell voltages, and thereafter, operates the cell balancing circuit 3 and measures the operation time. When the calculated period of time has elapsed from the point at which the operation of the cell balancing circuit 3 is started, the arm control device 6 stops the operation of the cell balancing circuit 3 and notifies the system control device 30 that the cell balance control has been completed.

As described above, according to the power storage system of this embodiment, since the arm where the cell balance control is conducted is disconnected from the power converter 20 only for a short period of time during which the cell voltage is measured in the cell balance control, it is possible to keep the voltage variation of the battery pack 2 of the arm during this period of time small. Accordingly, unlike the above-mentioned first embodiment, it is not necessary to adjust the voltage when the on/off device is switched from the open state to the closed state, and it is possible to reconnect the arm to the power converter at an early point. As a result, it is possible to conduct normal charging and discharging control while conducting the cell balance control, and to suppress the reduction in efficiency of the power storage system due to the cell balance control.

Third Embodiment

Figure 2:
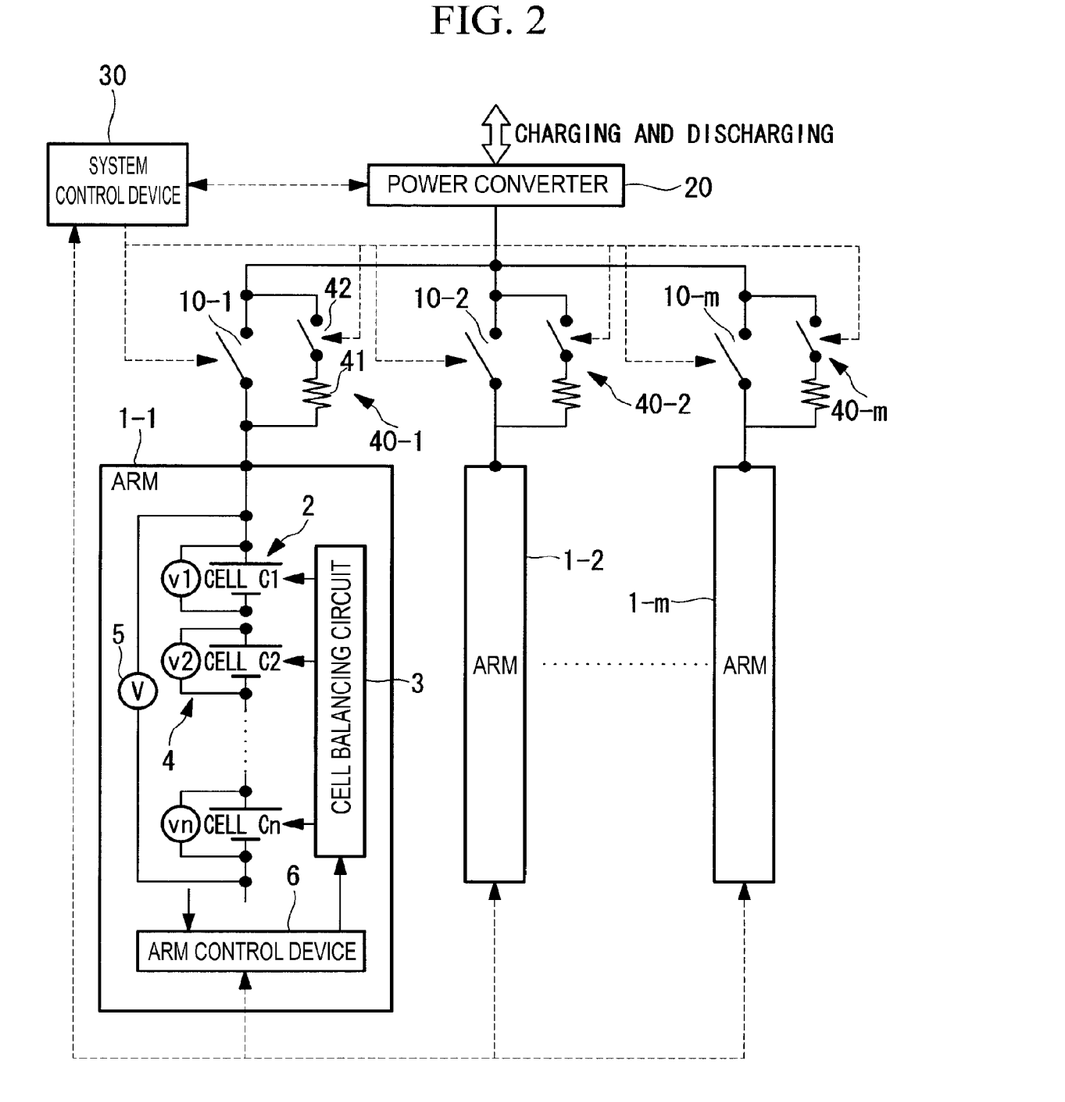
FIG. 2 is a diagram showing the schematic configuration of a power storage system according to a third embodiment of the present invention.

Next, a power storage system according to a third embodiment of the present invention will be described with reference to FIG. 2. In the following description of the power storage system according to this embodiment, a description of parts that are the same as those in the first embodiment will be omitted, and the differences will be mainly described. In addition, also in this embodiment, a description is given assuming that the cell balance control is determined to be required in the arm 1-1.

The power storage system in this embodiment differs from the first embodiment in that current control units 40-1, 40-2, ... and 40-$m$ are connected in parallel to the respective on/off devices 10-1, 10-2, ... and 10-$m$. The current control units 40-1, 40-2, ... and 40-$m$ are each configured so that a resistance element (resistive part) 41 and second on/off device 42 are connected in series.

With the power storage system having such a configuration, upon receiving a notification from the arm control device 6 of the arm 1-1 that the cell balance control of the arm 1-1 is required, the system control device 30 sets the on/off device 10-1, which has been in the closed state, to the open state, thereby setting the arm 1-1 and the power converter 20 to the disconnected state. In this state, the cell balance control of the arm 1-1 is conducted under the control of the arm control device 6, and after the cell balance control is completed, the arm control device 6 sends a notification that the cell balance control has been completed to the system control device 30. Upon receiving this notification, the system control device 30 sets the second on/off device 42 of the current control unit 40-1 corresponding to the arm 1-1 to the closed state while maintaining the on/off device 10-1 in the open state. Accordingly, the power converter 20 and the arm 1-1 are connected via the resistance element 41.

The system control device 30 sets the second on/off device 42 of the current control unit 40-1 to the open state and sets the on/off device 10-1 of the arm 1-1 to the closed state when the difference between the terminal voltage of the battery pack 2 of the arm 1-1 where the cell balance control has been conducted and the terminal voltages of the battery packs 2 of the other arms falls within a preset allowable range.

In this way, according to the power storage system of this embodiment, when the cell balance control is completed, because that arm and the power converter 20 are connected via the resistance element 41, it is possible to limit the amount of current flowing through the arm. In addition, by providing the resistance element 41 in this way, it is possible to connect the arm where the cell balance control has been conducted to the power converter 20 at an early point, and therefore, it is possible to improve the capacity of the power storage system.

In this embodiment, it is also possible to employ the following switching method for the on/off devices. For example, the system control device 30 sets the second on/off devices 42 and the on/off devices corresponding to the arms where the cell balance control is not conducted to the closed state, and when the cell balance control is to be conducted, it sets the second on/off device 42 and the on/off device corresponding to the arm where cell balancing is to be conducted to the open state. When the cell balance control is completed, the system control device 30 sets the second on/off device corresponding to the arm where the cell balance control has been conducted to the closed state, and furthermore, when the difference between the terminal voltage of the arm where the cell balance control has been conducted and the terminal voltages of the other arms fall within a preset allowable range, the system control device 30 sets the on/off device corresponding to the arm where the cell balance control has been conducted to the closed state. It is also possible to achieve similar effects and advantages by conducting switching of the on/off device in this way.

Fourth Embodiment

Figure 3:
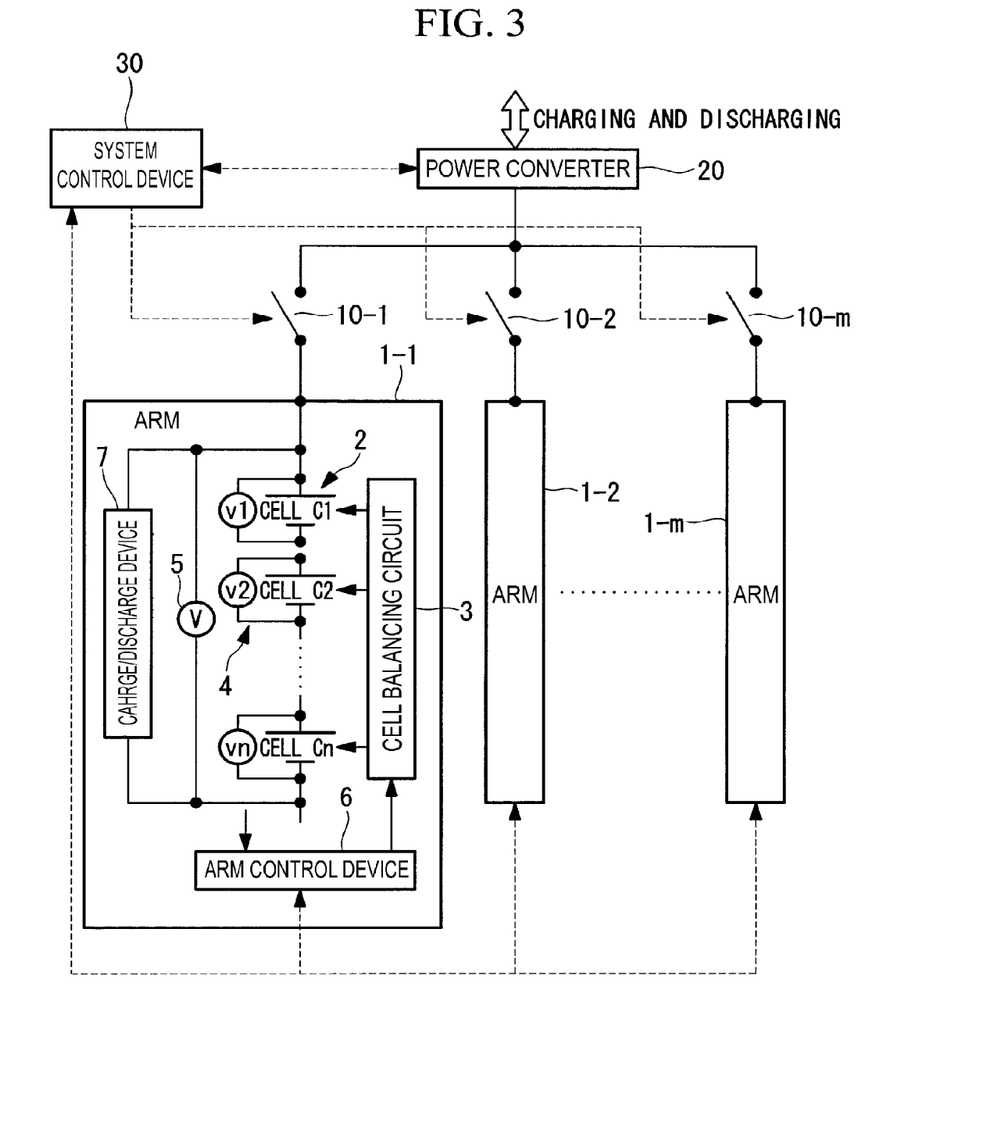
FIG. 3 is a diagram showing the schematic configuration of a power storage system according to a fourth embodiment of the present invention.

Next, a power storage system according to a fourth embodiment of the present invention will be described with reference to FIG. 3. In the following description of the power storage system according to this embodiment, a description of parts that are the same as those in the first embodiment will be omitted, and the differences will be mainly described. In addition, also in this embodiment, a description is given assuming that the cell balance control is conducted in the arm 1-1.

The power storage system in this embodiment differs from the first embodiment in that each of the arms 1-1, 1-2, ... and 1-$m$ is further provided with a charge/discharge device 7 that controls charging and discharging of the battery pack 2.

With the power storage system having such a configuration, when the cell balance control of the arm 1-1 is completed, the arm control device 6 compares the terminal voltage of the battery pack 2 of the arm 1-1 and the terminal voltages of the battery packs 2 of the other arms 1-2, ... and 1-$m$, thereby determining if the difference therebetween falls within the allowable range.

As a result, if the difference does not fall within the allowable range, the arm control device 6 operates the corresponding charge/discharge device 7 to perform charging and discharging of the battery pack 2, thereby making the terminal voltage of this battery pack 2 close to the terminal voltages of the battery packs 2 of the other arms 1-2, ... and 1-$m$. When the voltage difference falls within the allowable range, the arm control device 6 notifies the system control device 30 of this fact. Upon receiving this notification, the system control device 30 sets the on/off device 10-1 corresponding to the arm 1-1 to the closed state, thereby reconnecting the arm 1-1 to the power converter 20.

In this way, according to the power storage system of this embodiment, when the cell balance control is completed, if the difference between the terminal voltage of the battery pack 2 of the arm 1-1 where the cell balance control has been conducted and the terminal voltages of the battery packs 2 of the other arms 1-2, ... and 1-$m$ is large, it is possible to adjust the terminal voltage of the arm 1-1 by operating the charge/discharge device 7. Accordingly, it is possible to make the terminal voltage of the battery pack 2 of the arm 1-1 where the cell balance control has been conducted close to the terminal voltages of the battery packs 2 of the other arms at an early point, and it is possible to make the reconnection timing of the arm 1-1 where the cell balance control has been conducted even earlier.

Figure 4:
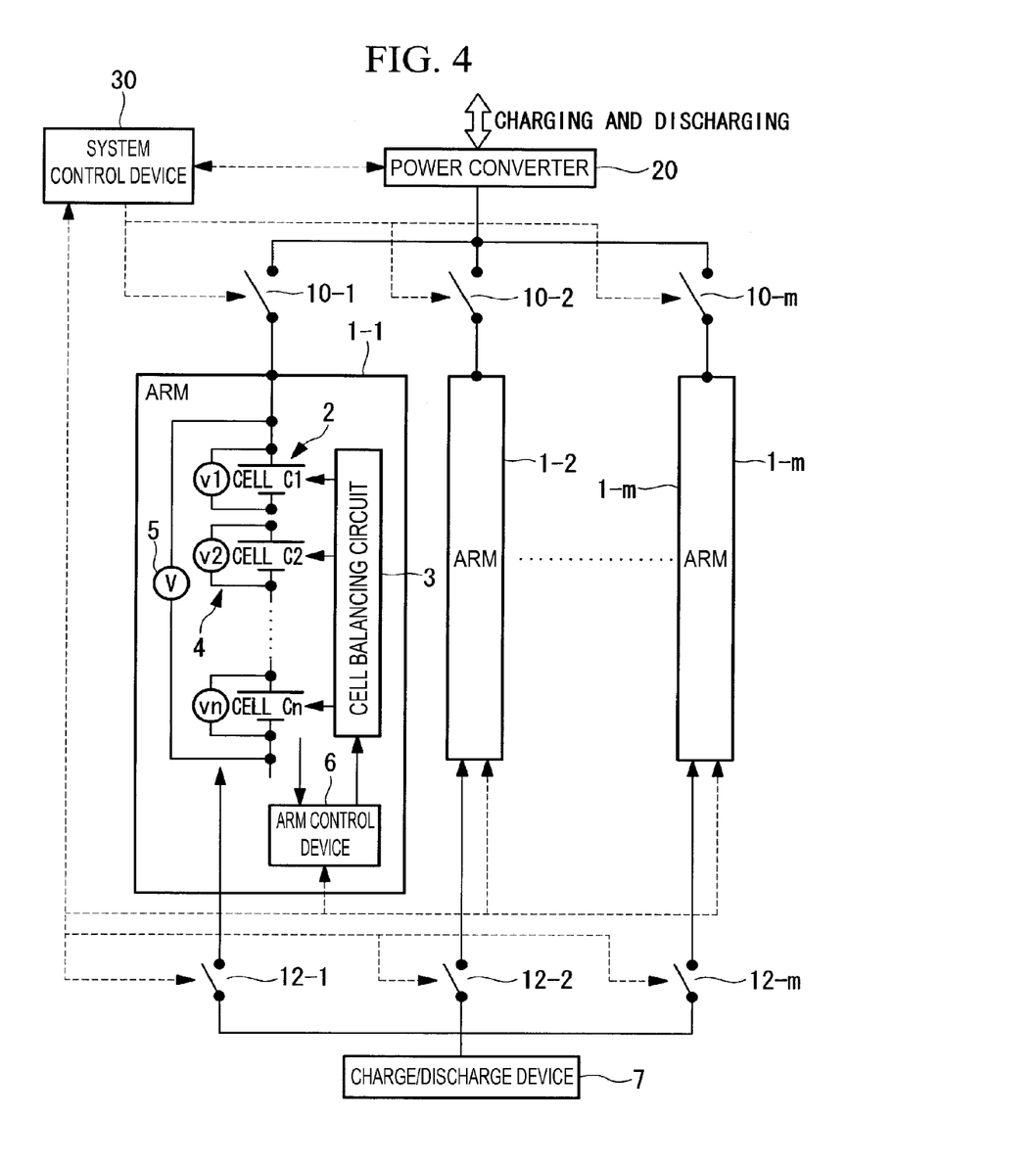
FIG. 4 is a diagram showing a modification of the power storage system according to the fourth embodiment of the present invention.

In the above-mentioned embodiment, although the charge/discharge devices 7 are provided in the respective arms 1-1, 1-2, ... and 1-$m$, as shown in FIG. 4, a single charge/discharge device 7 may be provided outside the arms 1-1, 1-2, ... and 1-$m$, and this charge/discharge device 7 is connected with the battery pack 2 of each of the arms 1-1, 1-1, ... and 1-$m$ through third on/off devices 12-1, 12-2, ... and 12-$m$. With such a configuration, charging and discharging of the battery pack 2 is performed by setting only the third on/off device corresponding to the battery pack 2 requiring charging and discharging to the closed state, thus connecting the battery pack 2 and the charge/discharge device 7.

Fifth Embodiment

Next, a power storage system according to a fifth embodiment of the present invention will be described with reference to FIG. 5. In the following description of the power storage system according to this embodiment, a description of parts that are the same as those in the first embodiment will be omitted, and the differences will be mainly described. In addition, also in this embodiment, a description is given assuming that the cell balance control is determined to be required in the arm 1-1.

Figure 5:
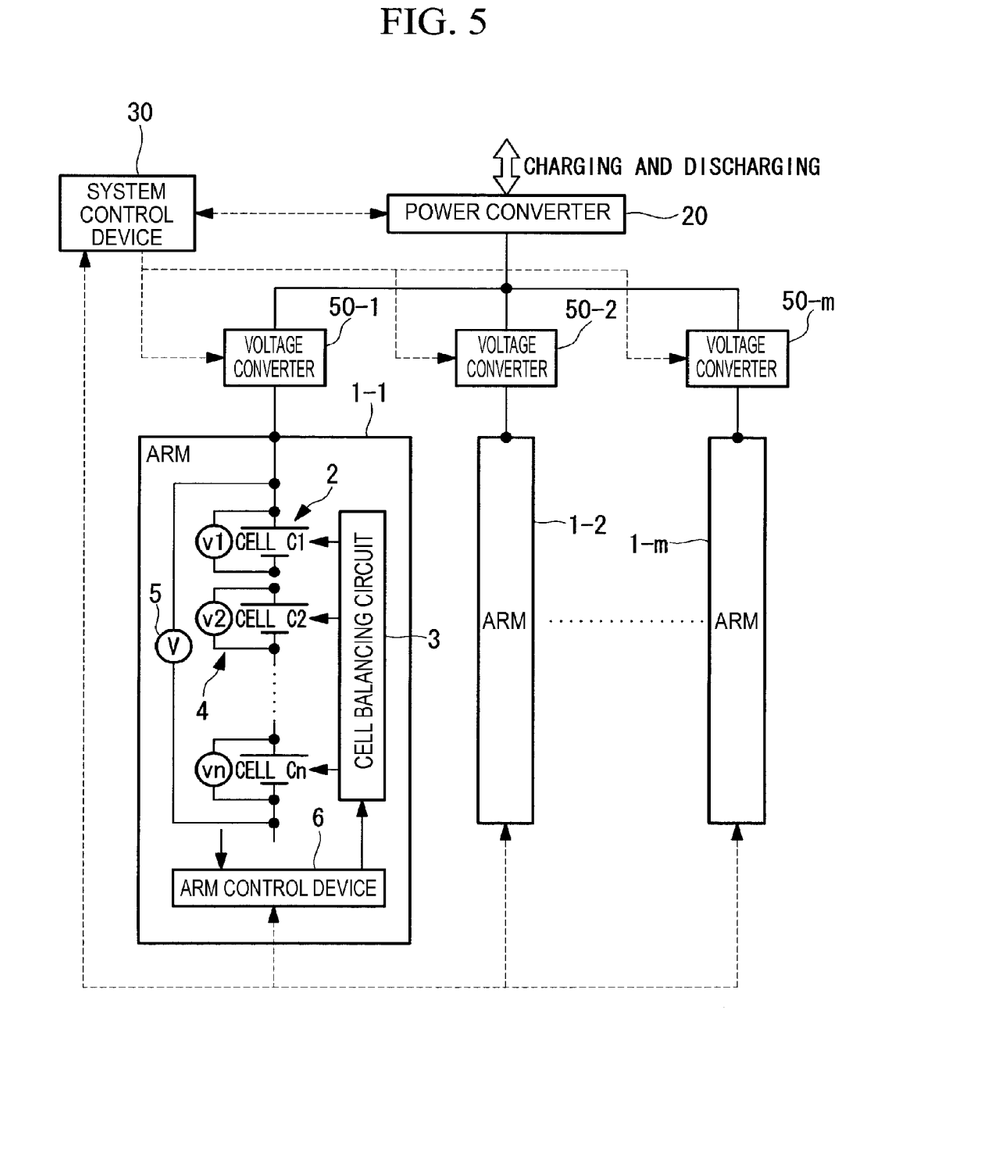
FIG. 5 is a diagram showing the schematic configuration of a power storage system according to a fifth embodiment of the present invention.

As shown in FIG. 5, the power storage system in this embodiment differs from the first embodiment in that voltage converters 50-1, 50-2, and 50-*m* are provided instead of the on/off devices 10-1, 10-2, and 10-*m*. The voltage converters 50-1, 50-2, and 50-*m* are, for example, converters.

With the power storage system having such a configuration, when the cell balance control of the arm 1-1 is started, the system control device 30 controls the voltage converter 50-1 so that the amount of current flowing through the arm 1-1 where the cell balance control is to be conducted is equal to or less than a rated value. At this time, the system control device 30 may stop the operation of the voltage converter 50-1. By stopping the operation thereof, the amount of current flowing through the arm 1-1 can be set to zero.

Upon receiving a notification from the arm control device 6 of the arm 1-1 that the cell balance control has been completed, the system control device 30 slowly restores the operation of the voltage converter 50-1 to the normal state. Thereby, the amount of current flowing through the arm 1-1 is increased, and after a predetermined period of time, the operation returns to the normal charging and discharging state.

In this way, according to the power storage system of this embodiment, because the voltage converters 50-1, 50-2, and 50-*m* are provided instead of the on/off devices 10-1, 10-2, and 10-*m*, it is possible to control the amount of current flowing through each of the arms 1-1, 1-2, . . . and 1-*m*, by controlling the operation of these voltage converters 50-1, 50-2, and 50-*m*. Accordingly, for example, it is possible to prevent an overcurrent from flowing through the arm by operating the voltage converter when the cell balance control is conducted, so as to control the amount of current flowing through the arm where the cell balance control is conducted, and in addition, by slowly restoring the operation of the voltage converters to the normal state when the cell balance control is completed.

In addition, according to such a configuration, depending on the operating conditions of the voltage converters, it is possible to keep the arm under the cell balance control in a state where it is connected with the power converter 20 at all times, and therefore, it is possible to perform charging and discharging of the arm even if the cell balance control is being conducted. Accordingly, it is possible to improve the capacity of the power storage system.

In addition, in this embodiment, when a required amount of power cannot be supplied by the other arms 1-2, . . . and 1-*m* during the cell balance control of the arm 1-1, the system control device 30 may stop the cell balance control of the arm 1-1 and restore the operation of the voltage converter 50-1 corresponding to the arm 1-1 where the cell balance control has been conducted to the normal state. By doing so, it is possible to operate the power storage system while maintaining the performance thereof, even when the cell balance control is being conducted.

In addition, in this embodiment, although the operation of the voltage converter 50-1 is controlled over the period during which the cell balance control is conducted, instead of this, the operation of the voltage converter 50-1 may be controlled only during the measurement of the cell voltage, as in the above-mentioned second embodiment. Accordingly, it is possible to restore the voltage converter 50-1 to the normal operational state at an early point, and to suppress a reduction in charging and discharging efficiency of the power storage system due to the cell balance control.

Figure 6:
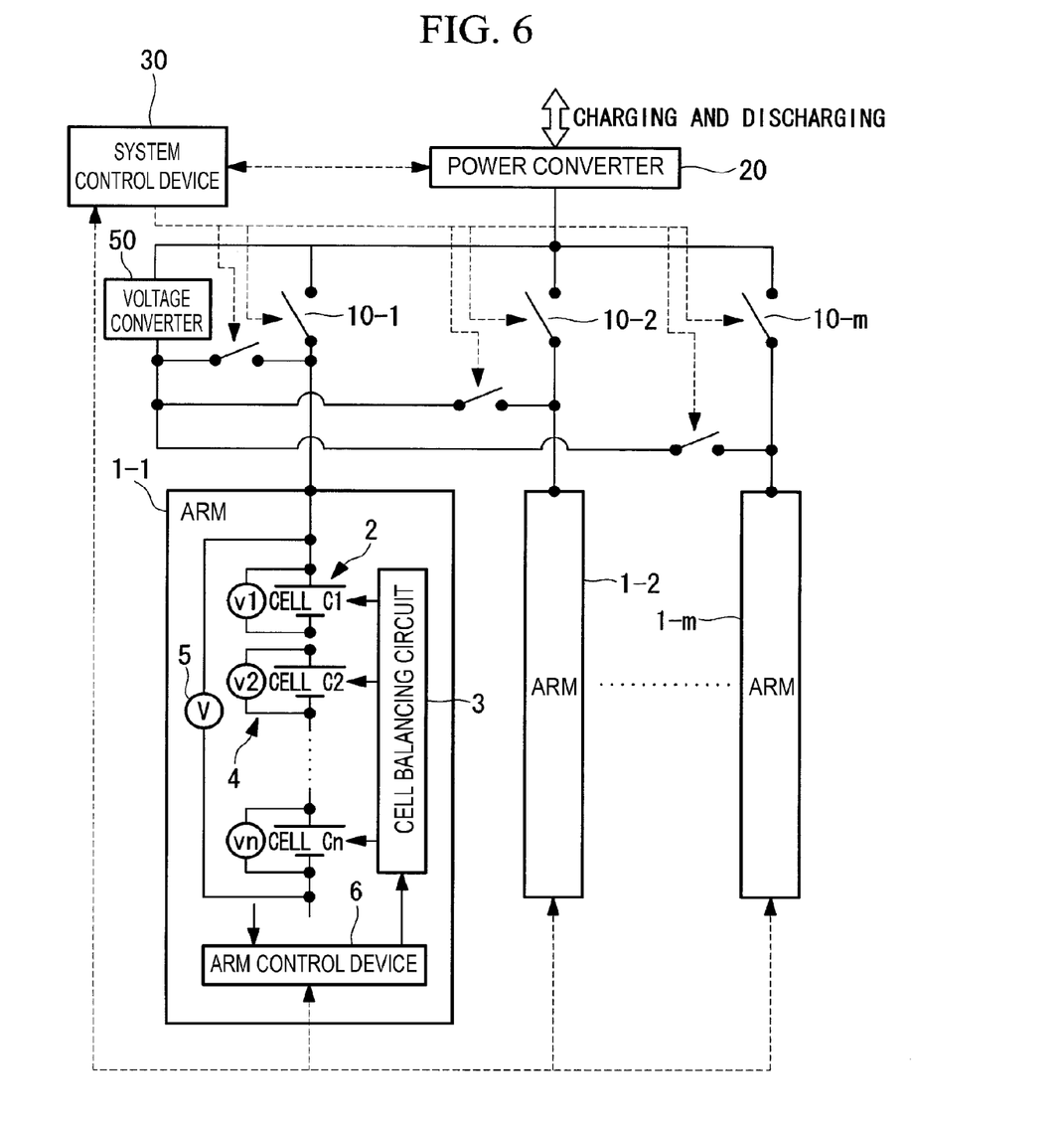
FIG. 6 is a diagram showing a modification of the power storage system according to the fifth embodiment of the present invention.

In addition, in this embodiment, as shown in FIG. 5, although the voltage converters 50-1, 50-2, and 50-*m* are provided in correspondence to each of the arms, instead of this configuration, for example, as shown in FIG. 6, one voltage converter 50 may be provided, and this voltage converter 50 may be connected with each of the arms 1-1, 1-2, . . . and 1-*m* through fourth on/off devices. With such a configuration, the same advantages as in the case of the configuration shown in FIG. 5 can also be achieved by setting only the fourth on/off device corresponding to the arm 1-1 where the cell balance control is being conducted to the closed state to connect this arm 1-1 to the power converter 20 through the voltage converter 50.

Sixth Embodiment

Next, a power storage system according to a sixth embodiment of the present invention will be described.

In each of the above-mentioned embodiments, a case has been described where one arm 1-1 is subjected to the cell balance control; however, this embodiment differs in that cell balance control of a plurality of arms is conducted simultaneously. In the following, a control method for the system control device according to this embodiment will be described with reference to the first embodiment shown in FIG. 1 as an example system configuration.

In the power storage system according to this embodiment, in the system control device 30, there is a maximum number of arms capable of conducting the cell balance control simultaneously, and the system control device 30 conducts the cell balance control within the range of this maximum number. For example, this maximum number is set to a number that can cope with an average load.

When the number of arms notified as requiring the cell balance control from the arm control device 6 provided in each of the arms 1-1, 1-2, . . . and 1-*m* exceeds the above-mentioned maximum number, the system control device 30 obtains information about the cell voltages from each of the arms control devices 6, and on the basis of this information, allows the cell balance control to be conducted with priority given to arms with larger cell voltage unevenness. At the point when the cell balance control is completed, the arms where cell balance control is to be conducted are switched, thereby sequentially conducting the cell balance control in the arms that are waiting for their turn.

As described above, according to the power storage system of this embodiment, it is possible to conduct the cell balance control efficiently, and to equalize the cell voltage unevenness between the arms.

In the above-mentioned description, although the arms where the cell balance control is to be conducted are switched when the cell balance control is completed, instead of this, the timing of switching the arms may be set as follows.

For example, the system control device 30 periodically receives the cell voltages of the battery packs 2 from the arm control device 6 of the arm where the cell balance control is being conducted and the arm control device 6 of the arms waiting for the cell balance control, and the system control device 30 calculates, from the cell voltages received from each of the arms, the maximum value of the cell voltage differences for every arm. When the difference between the maximum value of the cell voltage differences of the arm where the cell balance control is being conducted and the maximum value of the cell voltage differences of the arms waiting for the cell balance control is equal to or less than a preset threshold, switching of the arms where the cell balance control is to be conducted is performed.

By doing so, it is possible to equalize the cell voltage unevenness between the arms. As a result, it is possible to prevent excessive unevenness among the cell voltages in the arms waiting for the cell balance control.

MODIFICATION

In each of the above-mentioned embodiments, although the cell balance control and so forth are conducted by providing the arm control device 6 in each of the arms 1-1, 1-2, ... and 1-*m* and by sending and receiving information between this arm control device 6 and the system control device 30, the configuration and the arrangement of the control device 30 are not limited thereto.

Figure 7:
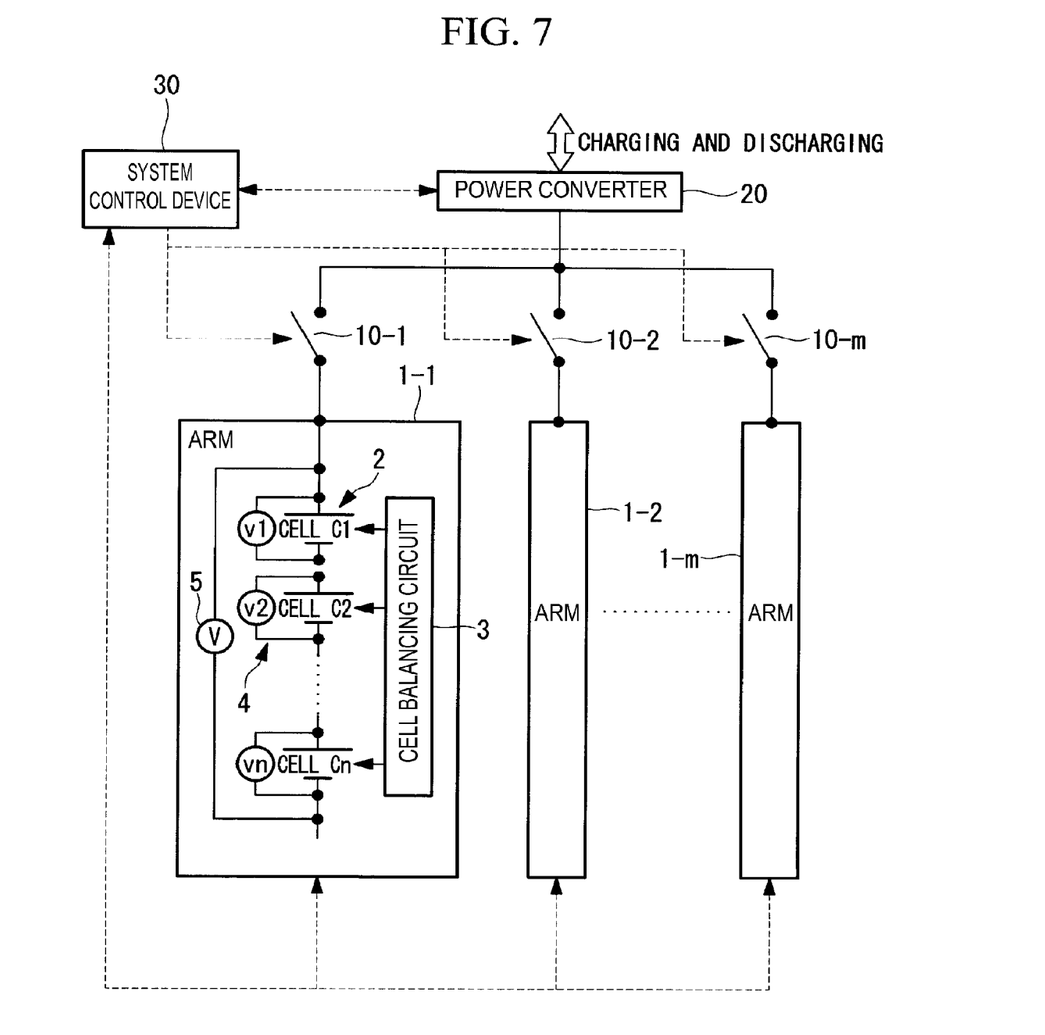
FIG. 7 is a diagram showing a modification of the power storage system according to the first embodiment of the present invention.

For example, as shown in FIG. 7, the arm control device 6 provided in each of the arms 1-1, 1-2, ... and 1-*m* (see FIG. 1) may be omitted, and all control related to the cell balance control may be conducted by only the system control device 30 by shifting the function of the arm control devices 6 to the system control device 30.

Figure 8:
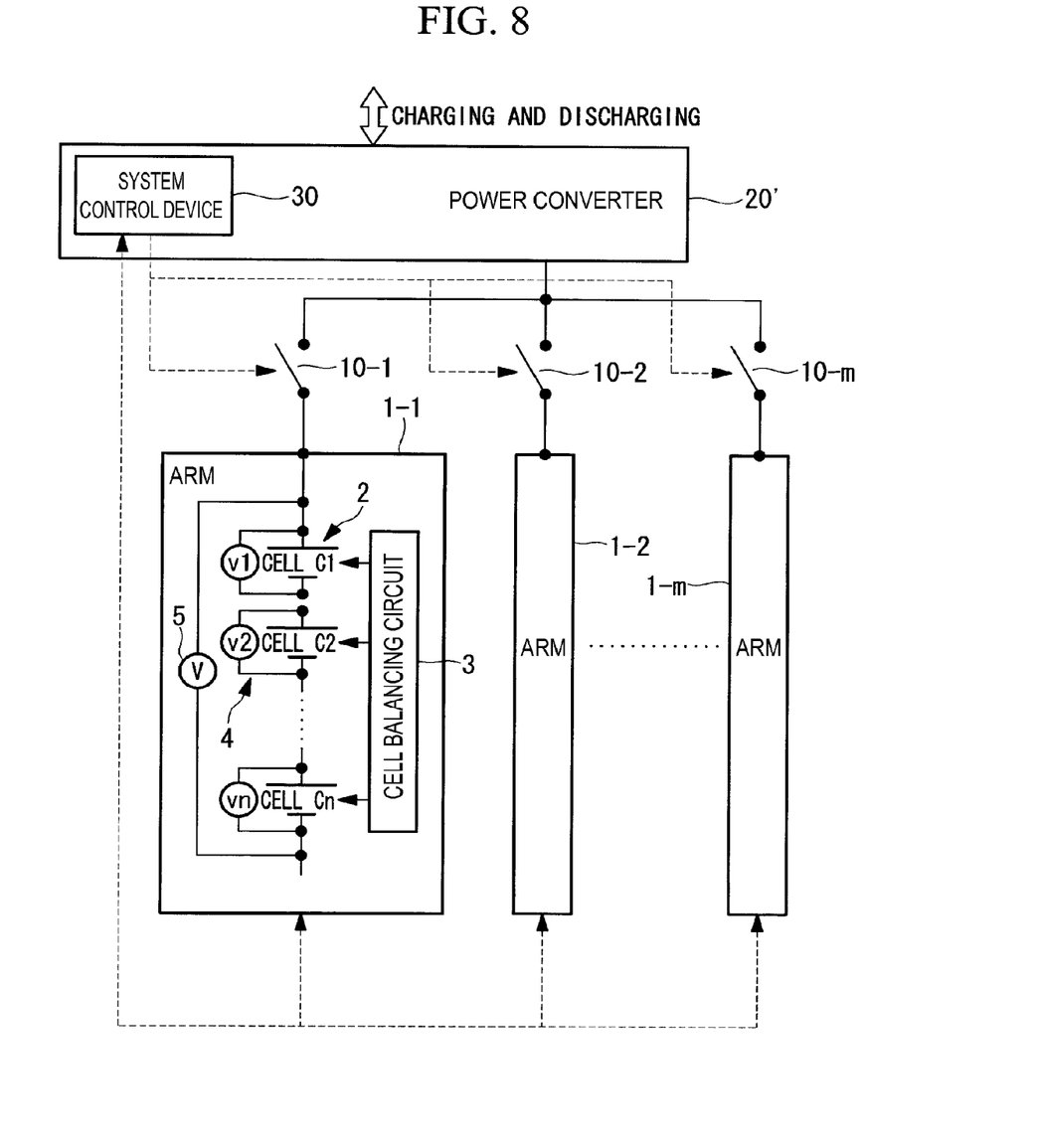
FIG. 8 is a diagram showing a modification of the power storage system according to the first embodiment of the present invention.

In addition, in this case, as shown in FIG. 8, the system control device 30 may be provided in the power converter 20'.

The invention claimed is:

1. A power storage system comprising:
a plurality of battery modules that are connected in parallel and that are connected to a power converter that controls charging and discharging;
a plurality of first on/off devices that are provided between each of the battery modules and the power converter;
a resistive part that is connected in parallel with each of the first on/off devices;
a second on/off device that is connected in series with the resistive part; and
a control unit that controls the first on/off devices and the second on/off device,
each of the battery modules having
a battery pack with a plurality of batteries connected in series; and
a cell balancing circuit provided in correspondence to the battery pack,
wherein the control unit
sets the first on/off devices and the second on/off device corresponding to the battery module where cell balance control is conducted to an open state when the cell balance control by the cell balancing circuit is started; and
sets the second on/off device corresponding to the battery module where the cell balance control has been conducted to a closed state when the cell balance control of the battery module is completed; and
sets the second on/off device to an open state and sets the first on/off device that is connected in parallel with the second on/off device to the closed state when the difference between the terminal voltage of the battery module where the cell balance control has been conducted and the terminal voltages of the other battery modules falls within a preset allowable range.

2. A power storage system comprising:
a plurality of battery modules that are connected in parallel and that are connected to a power converter that controls charging and discharging;
a plurality of first on/off devices that are provided between each of the battery modules and the power converter;
a resistive part that is connected in parallel with each of the first on/off devices;
a second on/off device that is connected in series with the resistive part; and
a control unit that controls the first on/off devices and the second on/off device,
each of the battery modules having
a battery pack with a plurality of batteries connected in series, and
a cell balancing circuit provided in corresponding to the battery pack,
wherein the control unit
sets the second on/off device and the first on/off device corresponding to the battery module to a closed state for the battery module where the cell balance control is not conducted;
sets the second on/off device and the first on/off device corresponding to the battery module to an open state when the cell balance control of the battery module is to be conducted;
sets the second on/off device corresponding to the battery module where the cell balance control has been conducted to the closed state when the cell balance control is completed; and
sets the first on/off device corresponding to the battery module where the cell balance control has been conducted to the closed state when the difference between the terminal voltage of the battery module where the cell balance control has been conducted and the terminal voltages of the other battery modules falls within a preset allowable range.

3. A power storage system according to claim 1, further comprising:
a charge/discharge device that adjusts a voltage of each of the battery packs, wherein, when the cell balance control is completed, the control unit operates the charge/discharge device in accordance with the difference between the terminal voltage of the battery module where the cell balance control has been conducted and the terminal voltages of the other battery modules.

4. A power storage system according to claim 1 wherein, when the cell balance control by the cell balancing circuit is started, the control unit sets the first on/off device corresponding to the battery module where the cell balance control is conducted to the open state only for a period of time during which each of cell voltages of the battery pack that is subjected to the cell balance control is measured.

5. A power storage system comprising:
a plurality of battery modules that are connected in parallel and that are connected to a power converter that controls charging and discharging;
a plurality of voltage converters that are provided between each of the battery modules and the battery converter;
a control unit that controls the voltage converters,
each of the battery modules having
a battery pack with a plurality of batteries connected in series, and
a cell balancing circuit provided in correspondence to the battery pack,
wherein the control unit
when the cell balance control by the cell balancing circuit is started, controls the voltage converter so that the amount of current flowing through the battery module where the cell balance control is conducted is equal to or less than a rated value, and when the cell balance control is completed, restores an operation of the voltage converter to a normal state.

6. A power storage system according to claim 5 wherein, the control unit:
stops the cell balance control when a required amount of power depending on a state of a load cannot be supplied by a power supply from the other battery modules alone during the cell balance control and restores the operation of the voltage converter corresponding to the battery module where the cell balance control has been conducted to the normal state.

7. A power storage system according to claim 5 wherein, when the cell balance control by the cell balancing circuit is started, the control unit controls the voltage converter only for a period of time during which each of the cell voltages in the battery pack that is subjected to the cell balance control is measured, so that the amount of current flowing through the battery module where the cell balance control is conducted is equal to or less than the rated value, and after the measurement of the cell voltage, restores the operation of the voltage converter to the normal state.

8. A power storage system according to claim 5, further comprising:
one voltage converter which is connected to the power converter; and a fourth on/off device provided between each of the battery modules and the voltage converter;
wherein the control unit
sets the on/off device corresponding to the battery module where the cell balance control is to be conducted to the open state and sets the fourth on/off device corresponding to the battery module to the closed state when the cell balance control by the cell balancing circuit is started; and
sets the on/off device, which has been in the open state, to the closed state and sets the fourth on/off device, which has been in the closed state, to the open state when the cell balance control is completed.

9. A power storage system according to claim 1, wherein there is a maximum number of battery modules capable of conducting the cell balance control simultaneously in the control unit, and the control unit conducts the cell balance control within the range of the maximum number.

10. A power storage system according to claim 9, wherein the control unit allows the cell balance control to be conducted with priority given to battery modules with larger cell voltage unevenness.

11. A power storage system according to claim 9, wherein when the difference between a cell voltage difference of the battery module where the cell balance control is being conducted and a cell voltage difference of a battery module waiting for the cell balance control is equal to or less than a preset threshold, the control unit performs switching of the battery modules where the cell balance control is to be conducted.

12. A power storage system according to claim 9, wherein a maximum number of battery modules capable of conducting the cell balance control simultaneously is set to a number that can deal with an average load.

13. A power storage system according to claim 2, further comprising:
a charge/discharge device that adjusts a voltage of each of the battery packs,
wherein, when the cell balance control is completed, the control unit operates the charge/discharge device in accordance with the difference between the terminal voltage of the battery module where the cell balance control has been conducted and the terminal voltages of the other battery modules.

14. A power storage system according to claim 2 wherein, when the cell balance control by the cell balancing circuit is started, the control unit sets the first on/off device corresponding to the battery module where the cell balance control is conducted to the open state only for a period of time during which each of cell voltages of the battery pack that is subjected to the cell balance control is measured.

15. A power storage system according to claim 2, wherein there is a maximum number of battery modules capable of conducting the cell balance control simultaneously in the control unit, and the control unit conducts the cell balance control within the range of the maximum number.

16. A power storage system according to claim 15, wherein the control unit allows the cell balance control to be conducted with priority given to battery modules with larger cell voltage unevenness.

17. A power storage system according to claim 15, wherein when the difference between a cell voltage difference of the battery module where the cell balance control is being conducted and a cell voltage difference of a battery module waiting for the cell balance control is equal to or less than a preset threshold, the control unit performs switching of the battery modules where the cell balance control is to be conducted.

18. A power storage system according to claim 15, wherein a maximum number of battery modules capable of conducting the cell balance control simultaneously is set to a number that can deal with an average load.

* * * * *